(12) United States Patent
Liang

(10) Patent No.: US 7,845,908 B1
(45) Date of Patent: Dec. 7, 2010

(54) TURBINE BLADE WITH SERPENTINE FLOW TIP RAIL COOLING

(75) Inventor: George Liang, Palm City, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 627 days.

(21) Appl. No.: 11/986,031

(22) Filed: Nov. 19, 2007

(51) Int. Cl.
*F01D 5/18* (2006.01)

(52) U.S. Cl. ................................... 416/97 R

(58) Field of Classification Search ............... 416/97 R
See application file for complete search history.

(56) References Cited

U.S. PATENT DOCUMENTS

| | | | |
|---|---|---|---|
| 4,411,597 A * | 10/1983 | Koffel et al. | ............ 416/92 |
| 5,660,523 A | 8/1997 | Lee | |
| 6,224,336 B1 | 5/2001 | Kercher | |
| 6,494,678 B1 | 12/2002 | Bunker | |
| 6,916,150 B2 | 7/2005 | Liang | |
| 6,932,571 B2 | 8/2005 | Cunha et al. | |
| 6,971,851 B2 | 12/2005 | Liang | |
| 7,270,514 B2 | 9/2007 | Lee | |

FOREIGN PATENT DOCUMENTS

| | | |
|---|---|---|
| JP | 61279702 A * | 12/1986 |
| JP | 2002195003 A * | 7/2002 |

OTHER PUBLICATIONS

JPO Machine Translation of JP 2002-195003 A. Accessed Sep. 10, 2010.*

* cited by examiner

*Primary Examiner*—Richard Edgar
(74) *Attorney, Agent, or Firm*—John Ryznic

(57) ABSTRACT

An air cooled turbine blade for a gas turbine engine, the blade including a blade tip with a serpentine flow cooling passage formed around the tip peripheral edge and extending from the trailing edge around the suction side of the blade tip, around the leading edge and around the pressure side of the blade tip. Pressurized cooling air is supplied from a trailing edge region cooling supply channel and into the suction side serpentine passage to flow toward the leading edge of the blade. Cooling air flows around the leading edge serpentine flow tip passage and then along the pressure side serpentine flow passage. Cooling air flows out through trailing edge exit holes to cool the trailing edge region. In a second embodiment, a flow blocking wall is formed in the serpentine flow passage to separate the suction side serpentine passage from the pressure side serpentine passage.

8 Claims, 4 Drawing Sheets

TURBINE BLADE WITH SERPENTINE FLOW TIP RAIL COOLING

BACKGROUND OF THE INVENTION

1. Field of the Invention

The present invention relates generally to turbine blades, and more specifically to cooling of the blade tip.

2. Description of the Related Art Including Information Disclosed Under 37 CFR 1.97 and 1.98

In a gas turbine engine, a hot gas flow is passed through a turbine to drive a compressor and propel an aircraft or, in the case of an industrial gas turbine (IGT) engine, to drive an electric generator and produce electrical energy. The efficiency of the turbine, and therefore the overall engine, can be increased by passing a higher temperature hot gas flow into the turbine.

However, the maximum temperature for the turbine is dependant upon the material properties of the first stage turbine airfoils (stator vanes and rotor blades) and the amount of internal cooling of these airfoils. Turbine airfoil designers attempt to maximize the cooling ability of a given amount of cooling air while at the same time minimizing the amount of cooling air used in order to further increase the engine efficiency. The compressed cooling air used to pass through these hot airfoils is generally bled off from the compressor and thus reduces the engine efficiency.

The rotor blades rotate within the turbine shroud and form a blade tip clearance gap between the blade tip and the inner surface of the shroud in which the hot gas flow passing through the turbine can also leak around. The blade tip leakage reduces the efficiency of the turbine as well as passes hot gas over the tips of the blades and produce hot spots that can lead to blade tip oxidation. The oxidized blade tip can destroy the critical surface shape of the airfoil and lead to decreased performance. Also, oxidized blades have a shortened life and must be replaced. Replacing turbine airfoils requires shutting down the engine and removing the damaged parts. An industrial gas turbine engine requires long running periods of around 48,000 hours. Shutting down an engine prematurely in order to repair damaged parts is costly and results in the loss of use of the engine.

On prior art turbine blade with tip cooling is U.S. Pat. No. 6,916,150 B2 issued to Liang on Jul. 12, 2005 and entitled COOLING SYSTEM FOR A TIP OF A TURBINE BLADE and represented in FIGS. 1 through 5 of this application. FIG. 1 shows the fully assembled turbine blade with the airfoil extending from the platform and root portions of the blade. FIG. 2 shows the airfoil tip portion 11 with a plurality of radial core print-out holes 12 that are typically cast into the airfoil tip and connect to the serpentine coolant passages formed within the airfoil. A tip cap 14 is secured to the blade tip 11 by an adhesive 13 to form the assembled blade. A transient liquid phase (TLP) bonding technique is used to secure the tip cap to the tip of the blade. The tip cap will cover over the core print-out holes 12 in the airfoil. An abrasive layer 15 is applied to the tip cap to promote rubbing with an abradable blade outer air seal (BOAS) surface to form a seal during blade rotation. A great benefit can be obtained with the use of this cooling construction concept for the blade tip cooling design with an abrasive material. as seen in FIGS. 4 and 5, a row of peripheral film cooling holes located on both the pressure side and the suction side of the airfoil just below the tip discharge film cooling air to the tip edge.

A disadvantage of the prior art blade tip cooling design is that the cooling flow distribution and pressure ratio across the film cooling holes for the airfoil pressure and suction sides as well as tip cooling holes are predetermined by the main body serpentine internal cavity pressure. Also, the blade tip region is subject to severe secondary flow field which translates into a large quality of film cooling holes and cooling flow that is required for cooling of the blade tip peripheral.

BRIEF SUMMARY OF THE INVENTION

It is an object of the present invention to provide for a turbine blade with tip peripheral edge cooling in order to lower the tip metal temperature and reduce the cooling flow requirement.

It is another object of the present invention to provide for a turbine blade with tip peripheral cooling in which the blade tip is bonded to the airfoil tip surface transient liquid phase bonding.

A turbine blade for use in a gas turbine engine in which the blade includes a micro serpentine flow cooling channel around the peripheral edge of the blade tip. the blade is formed with the serpentine passage in the blade tip or in the blade tip and the tip cap, and then the tip cap is bonded to the blade tip by a low pressure bonding process such as transient liquid phase bonding or TLP bonding. Tip edge film cooling holes are also formed in the blade tip and connect to the serpentine passage to discharge film cooling air and cool the tip peripheral area. The serpentine cooling passage around the tip edge can be supplies from a single supply cavity located at the trailing edge region, or the serpentine passage can be broken up into a pressure side serpentine passage and a suction side serpentine passage with the pressure side serpentine supplied from a supply cavity in the leading edge region and the suction side serpentine passage supplied from a supply cavity in the trailing edge region. The tip rail micro serpentine passages can be compartmentalized in order to tailor the gas side pressure distribution.

DETAILED DESCRIPTION OF THE INVENTION

Figure 1:
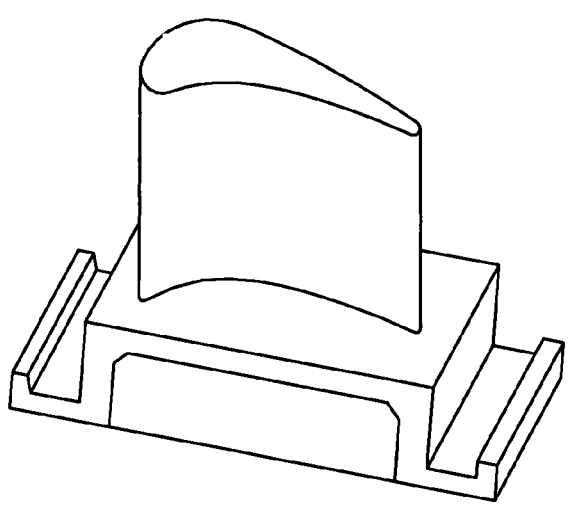
FIG. 1 shows a schematic view of a prior art turbine blade.
Figure 2:
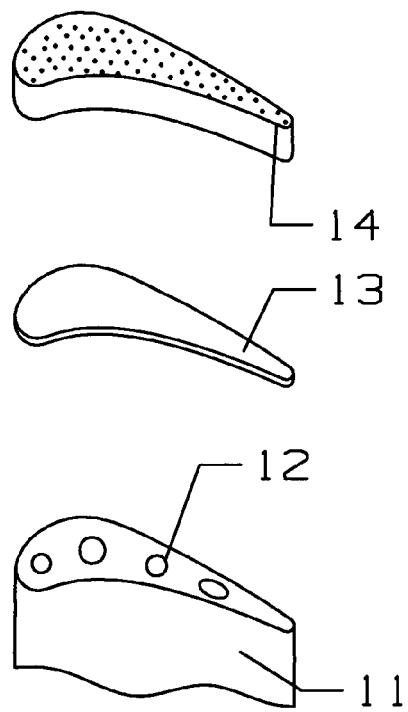
FIG. 2 shows an exploded view of the turbine blade tip construction.
Figure 3:
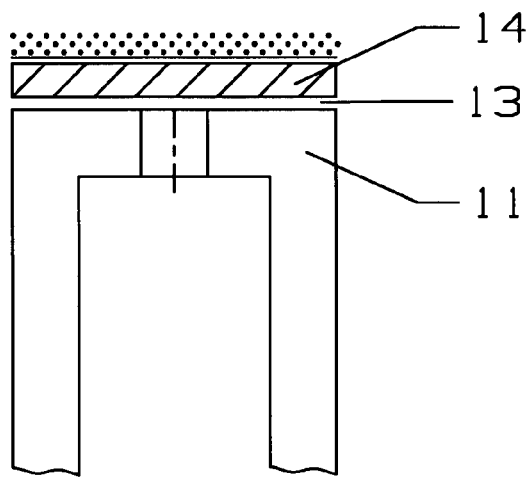
FIG. 3 shows a cross section side view of the turbine blade tip of FIG. 2 in the assembled state.
Figure 4:
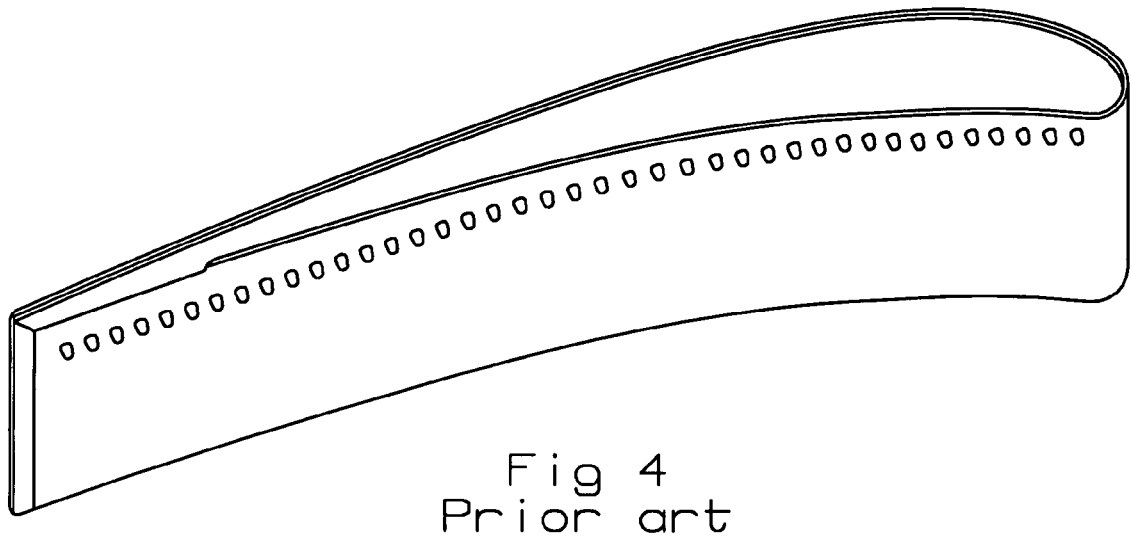
FIG. 4 shows a prior art turbine blade with pressure side film cooling holes and tip cooling holes on top.
Figure 5:
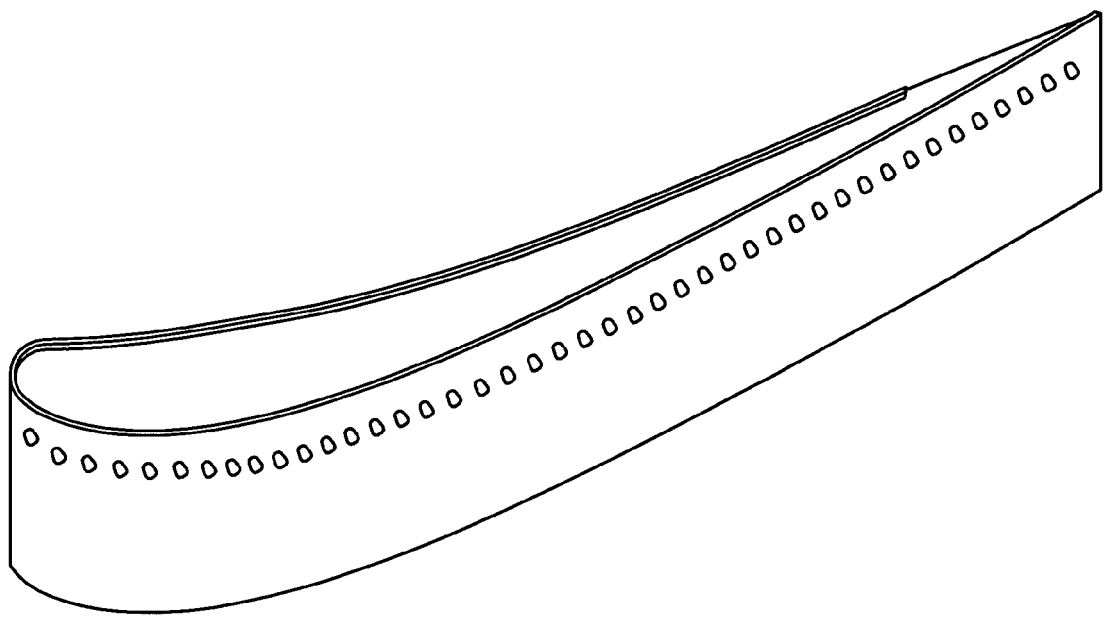
FIG. 5 shows a prior art turbine blade with suction side film cooling holes and tip cooling holes on top.
Figure 6:
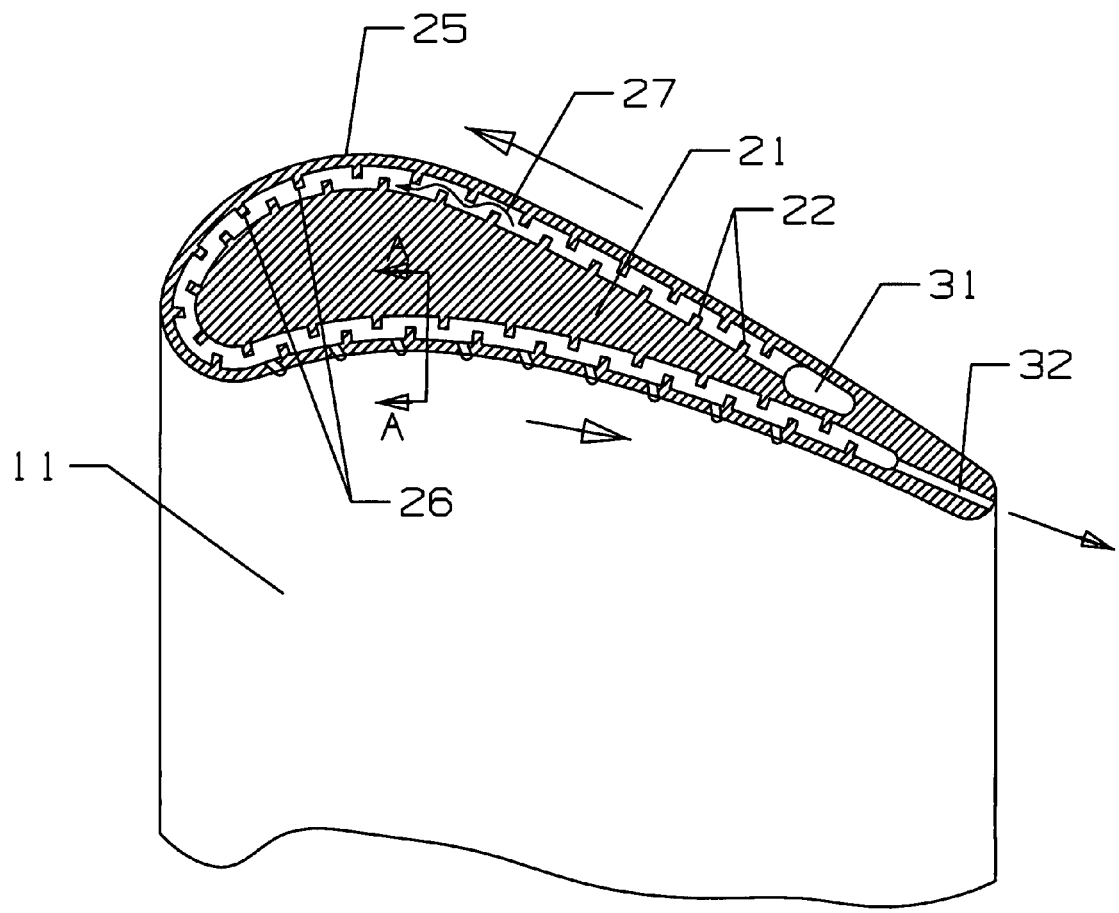
FIG. 6 shows a cross section top view of a first embodiment of the blade tip cooling circuit of the present invention.

The present invention is a turbine blade for use in a gas turbine engine in which the turbine blade includes a serpentine cooling passage formed around the periphery of the blade tip edge. The blade tip 11 is shown in FIG. 6 in the first embodiment of the present invention and includes a blade tip section 21 having an airfoil shape with a pressure side and suction side and a leading edge and trailing edge. The outer surface of the blade tip section 21 includes a plurality of outward extending projections 22 spaced around the tip periphery and form part of the serpentine passage to be described below.

The blade tip section also includes an outer peripheral wall surface 25 extending around the entire tip periphery with a plurality of inward extending projections 26 at certain spacing to form the serpentine passage with the projections 22 of the blade tip section 21. Thus, a serpentine flow passage 27 is formed by the projections 22 and 26 that are formed within the blade tip 11 by EDM or during the casting process of the blade tip. Also formed within the outer peripheral wall 25 of the blade tip are a number of film cooling holes 23 that connect the serpentine flow passage 27 with the outer wall of the pressure side and, if warranted, to the suction side of the blade tip to provide cooling thereof. The film cooling holes 23 are also formed by the same process that forms the projections 22 and 26 and the serpentine passage 27.

In the first embodiment of FIG. 6, a cooling air supply cavity 31 is located in the trailing edge region and supplies pressurized cooling air to the serpentine passage around the tip peripheral edge. Cooling air flows from the supply cavity 31 and through the serpentine passage around the suction side and then around the pressure side of the tip peripheral edge. Cooling air flows through the serpentine passage and is discharged through the film cooling holes 23, and then discharges through a trailing edge cooling hole 32 located at the trailing edge of the airfoil 11.

Figure 7:
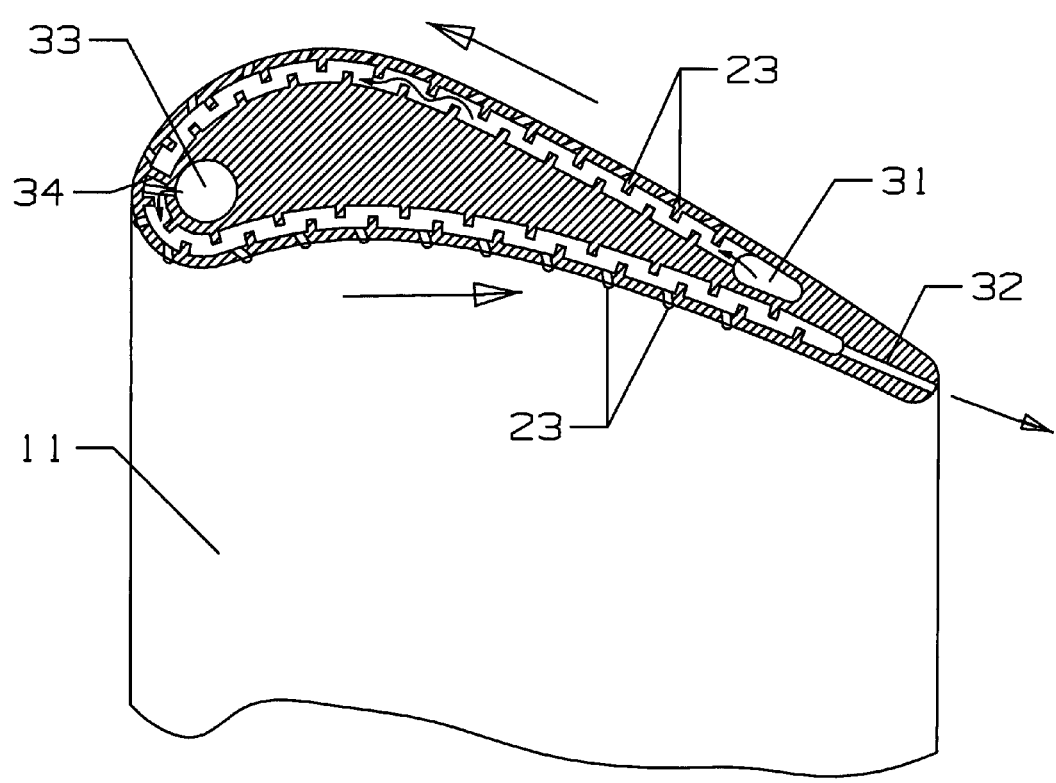
FIG. 7 shows a cross section top view of a second embodiment of the blade tip cooling circuit of the present invention.

FIG. 7 shows a second embodiment of the turbine blade with the serpentine flow cooling passage around the tip peripheral edge. In the second embodiment, the tip edge serpentine passage is subdivided into two separate passages. One passage is located on the suction side of the blade tip and the second passage is located on the pressure side. The two separate passages are separated by a separation wall 34 formed in the serpentine passage in the leading edge region. The cooling supply cavity 31 of the first embodiment is used in the second embodiment and supplies the cooling air for the suction side serpentine passage. A second cooling supply cavity 33 is located in the leading edge region and supplies the cooling air to the pressure side serpentine passage. The pressure side serpentine passage discharges into the trailing edge cooling hole 32 while the suction side serpentine passage discharges only through the film cooling holes 23 spaced around the peripheral tip edge on the suction side of the airfoil. The pressure side serpentine passage also includes film cooling holes 23 to discharge film cooling air to the pressure side tip periphery of the blade.

Figure 8:
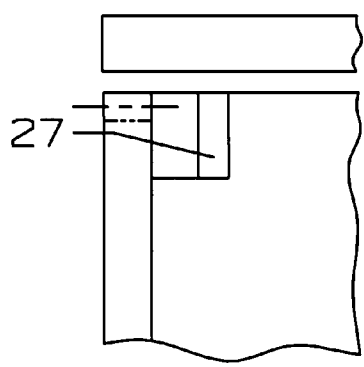
FIG. 8 shows a cross section view through line A-A of FIG. 6 with a tip cap.
Figure 9:
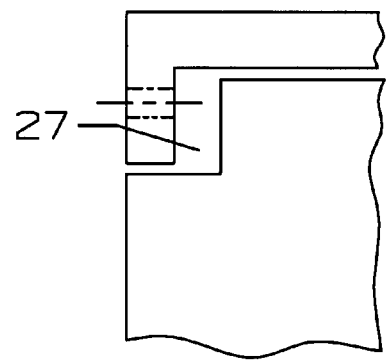
FIG. 9 shows a cross section view through line A-A of FIG. 6 with a tip cap having an extension that forms the outer wall of the serpentine flow path.

In either of the two embodiments, a tip cap is bonded to the blade tip to enclose the serpentine flow passage around the tip peripheral edge. The tip cap is bonded by the transient liquid phase bonding process because low pressure is only required. FIG. 8 shows a cross section view along the line A-A in FIG. 6 and shows this embodiment of the tip cap. The film hole is formed on the top edge of the outer wall of the airfoil that also forms the outer wall of the serpentine flow path along the tip peripheral. In another embodiment, the tip cap includes the outer peripheral walls on the pressure side and the suction side that have the inward extending projections 26 formed therein and the film cooling holes 23. FIG. 9 shows a cross section view of this embodiment of the tip cap with the extension having the film hole formed therein. This embodiment of the tip cap can also be formed by casting or by EMD or other similar machining of metal parts. The tip cap is also bonded to the blade tip by TLP bonding.

In operation, cooling air is supplied through the airfoil core printout holes, or one of the main body serpentine cooling passages, metered through a metering slot, flows along the serpentine passage along the suction side peripheral edge toward the airfoil leading edge, around the leading edge nose, and then flows along the serpentine passage on the pressure side tip peripheral. As cooling air flows along the serpentine passage, cooling air is also discharged into the airfoil mainstream gas flow from the pressure side micro serpentine flow channel as peripheral film cooling for the blade tip edge region.

In addition, the cooling flow circuit for the tip rail micro serpentine can be compartmentalized for tailoring the gas side pressure distribution. In FIG. 7 embodiment, the micro serpentine passage for the blade suction side tip rail is separate from the micro serpentine passage for the blade pressure side tip rail. Cooling air is fed from the airfoil trailing edge supply channel 31 and flows forward and discharges at the forward section of the blade. A second micro serpentine passage formed on the pressure side tip rail flows around the blade leading edge and pressure side tip rail while discharging cooling air periodically along the blade tip portion on the pressure side and leading edge region.

A number of advantages of the blade tip cooling design over the prior art cooling designs are listed below. Elimination of blade core print out hole. This eliminates the need for welding of core print out holes. Elimination of the drilling of blade tip cooling holes. Since the entire cooling passage is fabricated into the airfoil tip cap, the drilling of cooling holes around the blade tip edge and the blade top surface can be eliminated. Enhanced cooling flow control. Forming the serpentine cooling channel into compartments will allow for each individual cooling passage to be tailored to the various supply and discharge pressures around the airfoil tip. A cooler blade squealer tip is formed. Since the film holes are much closer to the squealer tip than the prior art film holes, this reduces the conduction distance and yields a much lower metal temperature. A reduction of the blade leakage flow and blade tip section heat load. The film cooling hole injects cooling air at much closer distance to the blade tip gap than the prior art blade tip peripheral film hole. The reparability of the blade tip treatment is improved. Any blade tip treatment layer can be stripped off and reapplied without the possibility of plugging holes or re-opening tip cooling holes. A higher overall blade tip cooling effectiveness is provided. Since coolant air is used first to cool the blade main body and then passed through the serpentine passages on the tip peripheral and then discharged into the airfoil pressure side as film cooling air, a higher heat transfer coefficient is generated by the micro serpentine flow passage in the horizontal flow channel, yielding a cooler blade tip. The counter flow cooling design and double usage of the cooling air improves the overall cooling efficiency.

I claim the following:
1. An air cooled turbine rotor blade comprising:
   an airfoil section having a leading edge region and a trailing edge region with a pressure side wall and a suction side wall both extending between the leading and trailing edge regions;
   a blade tip with a flat tip surface that is without a squealer pocket;
   a blade tip peripheral cooling channel extends along the suction side wall and around the leading edge region and then along the pressure side wall to form a continuous blade tip peripheral cooling channel; and,
   an alternating series of projections extending into the blade tip peripheral cooling channel that forms a serpentine flow path for cooling air.

2. The air cooled turbine rotor blade of claim 1, and further comprising: a cooling air supply channel located in the trailing edge region of the blade and connected to the blade tip peripheral cooling channel to supply cooling air.

3. The air cooled turbine rotor blade of claim 2, wherein the blade tip peripheral cooling channel includes a row of film cooling holes along only the pressure side wall to discharge cooling air from the blade tip peripheral cooling channel.

4. The air cooled turbine rotor blade of claim 1, and further comprising: a trailing edge exit hole connected to the tip peripheral cooling channel on the pressure side portion.

5. The air cooled turbine rotor blade of claim 1, and further comprising: the blade tip peripheral cooling channel includes a row of film cooling holes along the leading edge region of the channel.

6. An air cooled turbine rotor blade comprising:
- an airfoil section having a leading edge region and a trailing edge region with a pressure side wall and a suction side wall both extending between the leading and trailing edge regions;
- a blade tip with a flat tip surface that is without a squealer pocket;
- a suction side tip peripheral cooling channel with a first cooling air supply channel located near to the trailing edge region to supply cooling air to the suction side tip peripheral cooling channel;
- a pressure side tip peripheral cooling channel with a second cooling air supply channel located in the leading edge region to supply cooling air to the pressure side tip peripheral cooling channel;
- a separation wall separating the suction side tip peripheral cooling channel from the pressure side tip peripheral cooling channel; and,
- an alternating series of projections extending into the blade tip peripheral cooling channels that form a serpentine flow path for cooling air.

7. The air cooled turbine rotor blade of claim 6, and further comprising: the pressure side and suction side tip peripheral cooling channels both include a row of film cooling holes extending along each tip peripheral channel to discharge cooling air from each tip peripheral channel.

8. The air cooled turbine rotor blade of claim 6, and further comprising: a trailing edge exit hole connected to the pressure side tip peripheral cooling channel.

* * * * *